April 14, 1959 J. R. GUSTAFSON ET AL 2,882,041
MOTOR VEHICLE SUSPENSION
Filed July 28, 1955
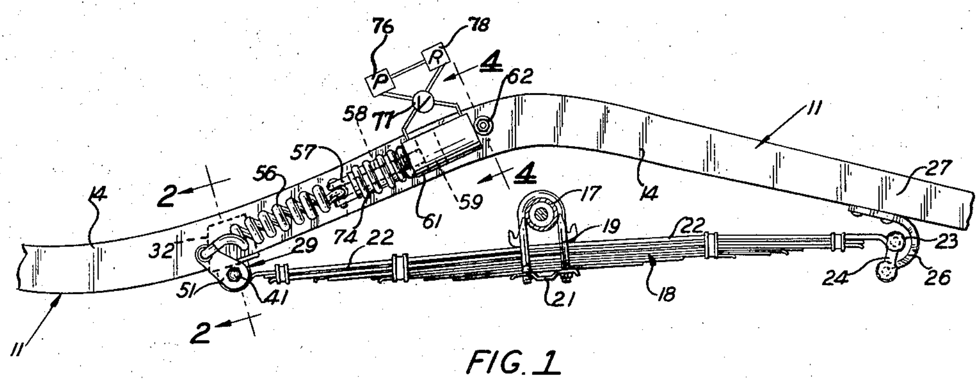
FIG. 1
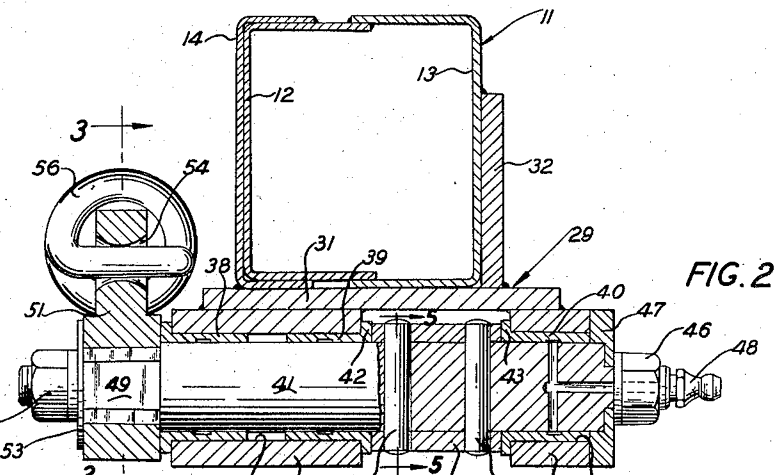
FIG. 2
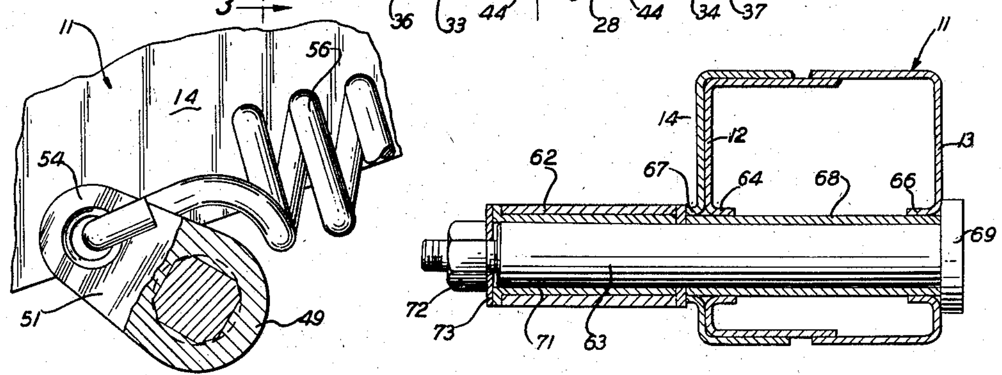
FIG. 3
FIG. 4
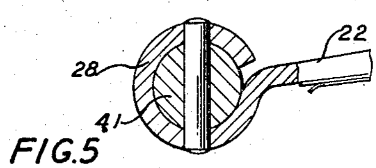
FIG. 5
J. R. GUSTAFSON
C. M. TSANG
INVENTORS
BY E. C. McRae
J. R. Faulkner
T. H. Oster
ATTORNEYS United States Patent Office 2,882,041

Patented Apr. 14, 1959

2,882,041

MOTOR VEHICLE SUSPENSION

John R. Gustafson, Detroit, and Chi Mou Tsang, Dearborn, Mich., assignors to Ford Motor Company, Dearborn, Mich., a corporation of Delaware Application July 28, 1955, Serial No. 525,001

7 Claims. (Cl. 267—17)

This invention relates generally to a motor vehicle suspension, and particularly to a ride leveling control for a motor vehicle suspension.

An object of the present invention is to provide a motor vehicle suspension incorporating a ride leveling device for adjusting the riding height of the vehicle to compensate for changes in the load carried by the vehicle.

A further object of the invention is to provide a ride leveling device for a motor vehicle suspension of the type using longitudinally extending leaf springs between the rear road wheels and the vehicle frame. The structure of the present invention may thus be applied to a conventional vehicle suspension system with a minimum of changes in the existing structure and with the addition of a minimum of easily manufactured and assembled parts.

In one embodiment of the invention, the eye at one end of the main leaf the leaf spring for each rear road wheel is nonrotatably connected to a cross shaft journaled in a bracket secured to the vehicle frame. A crank arm is connected to an extending end of the shaft and the outer end of the arm is connected by means of a coil spring to adjustable means mounted upon the vehicle frame. The adjustable means may be a hydraulic piston and cylinder actuated in response to changes in the riding height of the vehicle due to the loading thereof. This varies the loading of the coil spring and in turn varies the force supplied through the crank arm and spring eye to the main leaf of the spring to return the vehicle chassis to the predetermined rising height.

Other objects and advantages of this invention will be made more apparent as this description proceeds, particularly when considered in connection with the accompanying drawings, wherein:

Figure 1 is a side elevational view of a motor vehicle chassis incorporating the present invention.

Figures 2, 3, 4 and 5 are enlarged cross sectional views taken substantially on the planes indicated by the lines 2—2 of Figure 1, 3—3 of Figure 2, 4—4 of Figure 1, and 5—5 of Figure 2, respectively.

Referring now to the drawings, the reference character 11 indicates generally a box section frame side rail of a motor vehicle. As best seen in Figure 2, the frame rail 11 is formed of opposed channel shaped members 12 and 13 suitably welded together, and reinforced by an additional channel shaped member 14 secured to the inner side of the inner channel member 12. A rear road wheel is conventionally mounted at the outer end of an axle tube 17, and is connected to the vehicle frame by means of a leaf spring 18 extending longitudinally of the vehicle beneath the frame side rail 11. The leaf spring 18 is secured intermediate its ends to the axle tube 17 by means of U bolts 19 and plate 21.

At its rearward end the main leaf 22 of the leaf spring 18 is formed with an eye 23 conventionally connected by means of a spring shackle 24 to a rear spring hanger

26, the latter being generally C-shaped and having its upper flange 27 riveted to the frame rail 11.

Referring now particularly to Figures 1 and 2, it will be noted that the forward end of the main leaf 22 of the leaf spring is formed with an eye 28 rotatably supported in a front spring hanger indicated generally by the reference character 29. In the present instance the front spring hanger 29 is shown as a fabricated assembly including a base 31 and a side flange 32 welded to each other and to the box section frame rail 11, and a pair of transversely aligned bearing brackets 33 and 34 welded to the base 31. If desired, however, the front spring hanger may be suitably formed of a single member.

Aligned bores 36 and 37 are formed in the bearing brackets 33 and 34 respectively of the front spring hanger 29, and receive bushings 38, 39 and 40 which in turn rotatably support a cross shaft 41. The bushings 39 and 40 have opposed end flanges 42 and 43 embracing opposite ends of the eye 28 at the forward end of the main leaf 22 of the leaf spring 18. The cross shaft 41 passes through the spring eye 28 and is nonrotatably connected thereto by means of a pair of diametrically extending pins 44 extending through aligned openings in the cross shaft and the spring eye.

At its outboard end the cross shaft 41 is reduced in diameter and threaded to receive a nut 46 and a retaining washer 47. A lubricant fitting 48 is provided at this point to lubricate the shaft 41.

At its inboard end the cross shaft 41 is formed with a squared section 49 extending through a correspondingly shaped opening in a crank arm 51. Nut 52 and washer 53 hold the crank arm in position upon the shaft.

As seen in Figure 1, in the normal or unloaded condition the crank arm 51 is inclined forwardly and upwardly from the cross shaft 41. The upper end of the crank arm 51 is provided with an aperture 54 receiving the forward end of a relatively heavy coil spring 56. The coil spring 56 extends along the inboard side of the side frame rail 11, and at its rearward end is connected to the clevis end 57 of a piston rod 58. The piston rod 58 is connected to a piston 59 reciprocably received within a cylinder 61.

A ring 62 is welded to the opposite end of the cylinder 61 and, as best seen in Figure 4, is rotatably mounted upon a cross shaft 63 carried by the frame rail 11. The channel members 12, 13 and 14 of the frame rail 11 are formed with turned annular flanges 64, 66 and 67 respectively, supporting a tubular member 68 which in turn receives the cross shaft 63. The shaft 63 is formed with a head 69 at its outboard end and at its inboard end supports a bushing 71 rotatably receiving the ring 62 of the cylinder 61. A nut 72 and washer 73 complete the assembly. A flexible boot 74 encircles the piston rod 58 between the clevis end 57 thereof and the cylinder 61 to form a seal against foreign matter.

It will be apparent from the foregoing that the coil spring 56 exerts a force upon the main leaf 22 of the leaf spring 18 through the connection formed by the crank arm 51 and the spring eye 28. The magnitude of this force is dependent upon the position of the piston 59 in the cylinder 61. In the event the portion of the vehicle is loaded to such an extent as to lower the riding height thereof adjacent the rear wheels, or, in other words, to decrease the spring clearance, the desired riding height and spring clearance can be restored by a predetermined movement of the piston 59 within the cylinder 61 to increase the tension upon the coil spring 56. The resulting angular movement of the crank arm 51, in a clockwise direction as seen in Figure 1, applies torque to the spring eye 28 and the main leaf 22 of the leaf spring 18 to raise the vehicle frame relative to the road wheel and restore the riding height and spring clearance.

Fluid under pressure is supplied to the appropriate end of the cylinder 61 from a suitable conventional pump 76, shown diagrammatically in Figure 1. A control valve 77, arranged to be responsive to movement of the vehicle frame relative to the road wheel, controls the flow of fluid to and from the opposite ends of cylinder 61. A reservoir 78 is provided for the return flow.

A similar ride leveling construction may be provided at the opposite side of the vehicle frame in conjunction with the leaf spring for the road wheel at that side of the vehicle, so that both sides of the rearward portion of the vehicle may be leveled or restored to a predetermined riding height as load conditions vary.

While a hydraulic servo unit is shown as the adjusting means for the ride leveling control, other suitable power means or adjusting means may be used for this purpose if desired. The control may also be applied to the rearward end of the leaf spring rather than to the forward end thereof as shown. If necessary, the box section frame rail 11 may be suitably reinforced between the spring hanger 29 and the mounting 62 for the hydraulic cylinder to provide the proper rigidity and strength for the loads encountered.

It will be understood that the invention is not to be limited to the exact construction shown and described, but that various changes and modifications may be made without departing from the spirit and scope of the invention, as defined in the appended claims.

What is claimed is:

1. In a spring suspension for a motor vehicle having a frame and a road wheel, a leaf spring extending longitudinally of said frame and having its opposite ends connected to said frame and its intermediate portion connected to said road wheel, said leaf spring having an eye formed in one end, a rotatable shaft mounted upon said frame and nonrotatably connected to said spring eye, and means for rotating said shaft to vary the angular position of said spring eye to change the riding height of said vehicle frame relative to said road wheel.

2. In a spring suspension for a motor vehicle having a frame and a road wheel, a leaf spring extending longitudinally of said frame and connected intermediate its ends to said road wheel, a spring hanger pivotally connecting one end of said leaf spring to said frame, a bracket connected to said frame adjacent the opposite end of said leaf spring, said opposite end of said leaf spring having an eye formed therein, a shaft journaled in said bracket and extending through the eye of said spring, means securing the eye of said spring to said shaft, a lever secured to said shaft, a coil spring having one end connected to said lever, and means adjustably connecting the opposite end of said coil spring to said frame to vary the force supplied by said coil spring to the eye of said leaf spring to change the riding height of said vehicle frame relative to said road wheel.

3. In a spring suspension for a motor vehicle having a box section frame rail and a rear road wheel, a leaf spring extending longitudinally beneath said frame and connected intermediate its ends to said road wheel, a spring hanger supported upon said frame rail and pivotally connected to one end of said leaf spring, the opposite end of said leaf spring having an eye formed therein, a second spring hanger connected to said frame rail adjacent said spring eye, a cross shaft journaled in said second spring hanger and extending through said spring eye, a pin nonrotatably connecting said spring eye to said cross shaft, said cross shaft extending beyond the inner side of said box section frame rail, a crank arm nonrotatably connected to the inwardly extending end of said cross shaft, a coil spring extending longitudinally of said frame rail adjacent the inboard side thereof and connected at one end to said crank arm, a cylinder mounted upon said frame rail, a piston reciprocably mounted within said cylinder, a piston rod connected to said piston and to the opposite end of said coil spring, and means supplying fluid under pressure to said cylinder to vary the force applied by said coil spring to the eye of said leaf spring to change the riding height of said vehicle frame relative to said road wheel.

4. In a spring suspension for a motor vehicle having a frame and a road wheel, a leaf spring extending longitudinally of said frame and connected intermediate its ends to said road wheel, means pivotally connecting one end of said leaf spring to said frame, a bracket connected to said frame adjacent the opposite end of said leaf spring, said opposite end of said leaf spring having an eye formed therein, a shaft journaled in said bracket and extending through the eye of said spring, means securing the eye of said spring to said shaft, a lever on said shaft, and means operatively connected to said lever to vary the angular position thereof with respect to said frame to change the riding height of said frame relative to said road wheel.

5. The structure defined by claim 4 which is further characterized in that said last named means comprises a power unit mounted upon said vehicle frame and having a power operated movable element operatively connected to said lever.

6. The structure defined by claim 5 which is further characterized in that said power unit comprises a cylinder mounted upon said frame, a piston reciprocable within said cylinder, a coil spring interconnecting said piston and said lever, and hydraulic power means for adjusting the position of said piston within said cylinder.

7. In a spring suspension for a motor vehicle having a frame and a road wheel, a leaf spring extending longitudinally of said frame and having its opposite ends connected to said frame and its intermediate portion connected to said road wheel, a transversely extending shaft pivotally mounted upon said frame and nonrotatably connected to one end of said leaf spring, and adjustable means for rotating said shaft about its axis to change the riding height of said vehicle frame relative to said road wheel.

References Cited in the file of this patent

UNITED STATES PATENTS

| | | |
|---|---|---|
| 1,408,892 | Krefl | Mar. 7, 1922 |
| 1,539,113 | Halladay | May 26, 1925 |
| 1,539,179 | Goodwin | May 26, 1925 |
| 1,569,535 | Cole | Jan. 12, 1926 |
| 2,068,676 | Hickman | Jan. 26, 1937 |